United States Patent [19]

Dal Palù

[11] Patent Number: 4,718,568

[45] Date of Patent: Jan. 12, 1988

[54] FUEL FILLER MEMBER FOR VEHICLES

[75] Inventor: Attilio Dal Palù, Rivoli, Italy

[73] Assignee: Fabbrica Italiana Serrature Torino Fist, Turin, Italy

[21] Appl. No.: 930,006

[22] Filed: Nov. 12, 1986

[30] Foreign Application Priority Data

Nov. 15, 1985 [IT] Italy .............................. 54044/85[U]

[51] Int. Cl.⁴ .............................................. B65B 3/18
[52] U.S. Cl. ........................... 220/86 R; 220/85 VR; 147/295; 147/392; 138/113; 138/121; 285/131; 285/227; 285/423; 285/913
[58] Field of Search .............. 220/85 R, 85 F, 85 VR, 220/85 VS, 86 R, 86 AT; 285/913, 423, 131, 227; 138/111–117, 121, 122; 141/285–310, 392

[56] References Cited

U.S. PATENT DOCUMENTS

| 3,646,972 | 3/1972 | Kuypers | 138/111 |
| 3,837,364 | 9/1974 | Jenners | 138/111 |
| 4,274,549 | 6/1981 | Germain | 220/85 VR |
| 4,300,699 | 11/1981 | Anhegger | 220/86 R |

Primary Examiner—Houston S. Bell, Jr.
Attorney, Agent, or Firm—Gifford, Groh, VanOphem, Sheridan, Sprinkle and Dolgorukov

[57] ABSTRACT

A fuel filler member for vehicles is disposed between and fluidly connects a fuel filler inlet on the vehicle with the vehicle fuel tank. The fuel member includes a first corrugated filler pipe placing the inlet and tank in fluid communication, and a second corrugated breather pipe contained within the first pipe, for conveying air present in the tank towards the fuel filler inlet. The first and second pipes are made of nylon, while the sleeves and/or members connecting the pipes to the filler inlet and tank are made of an acetal resin.

16 Claims, 9 Drawing Figures

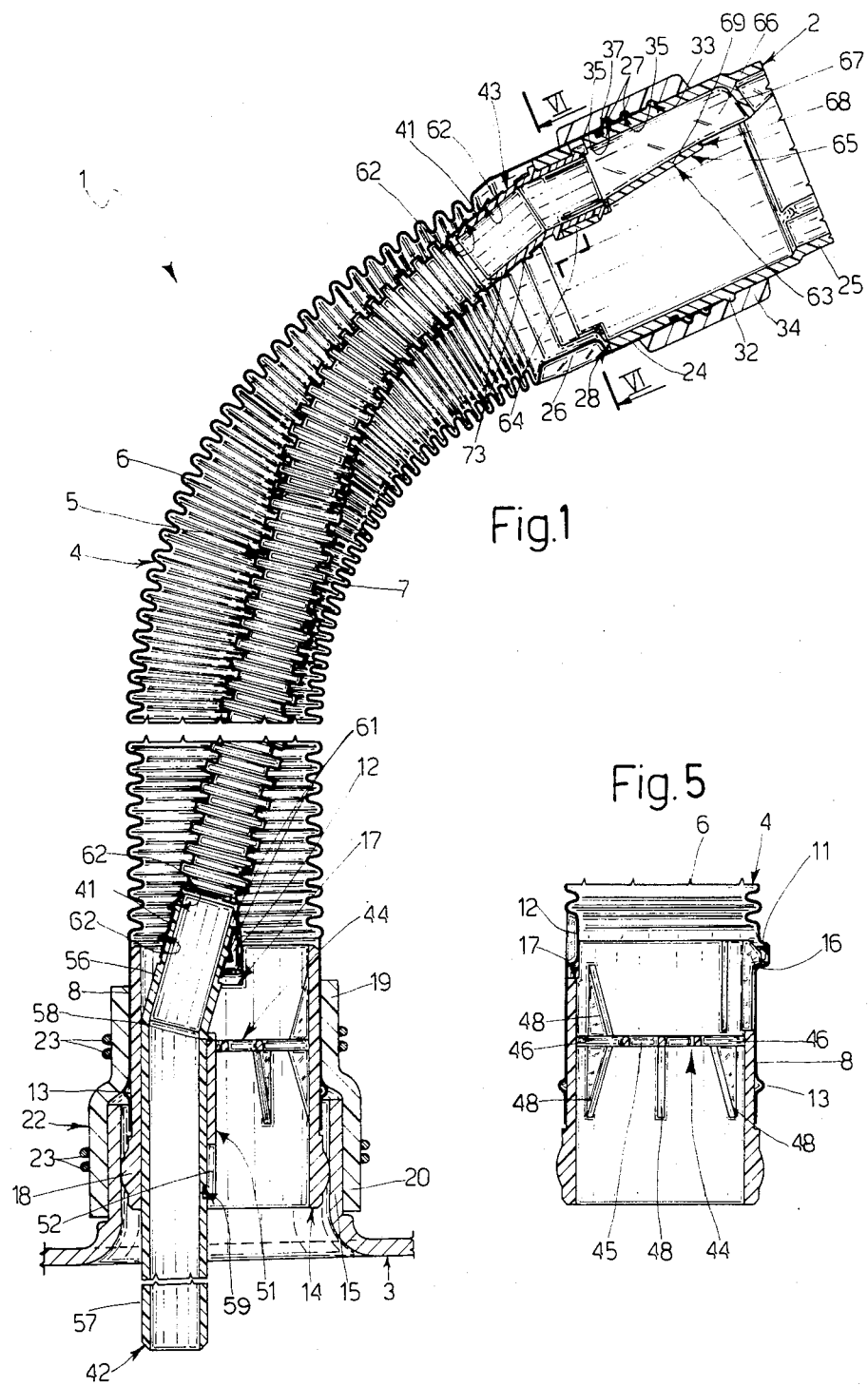

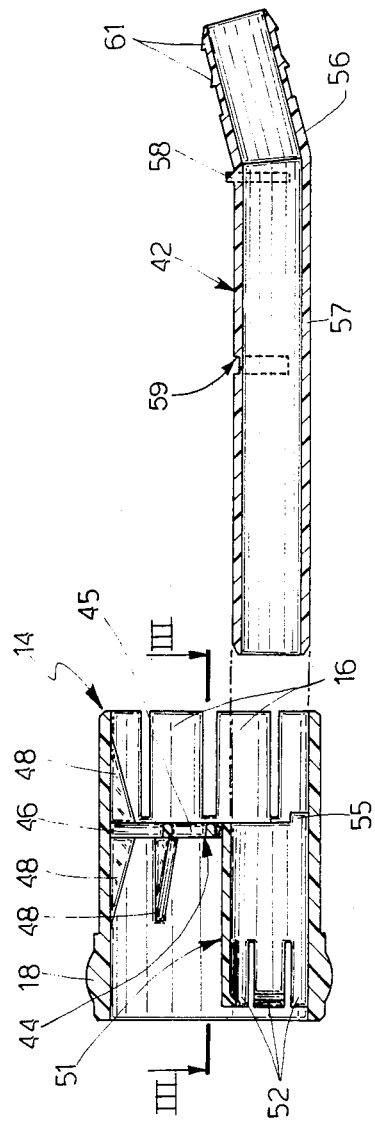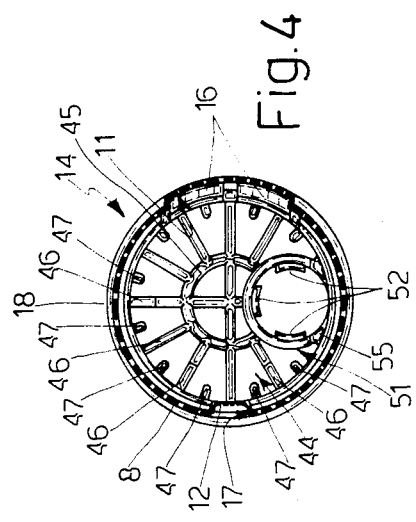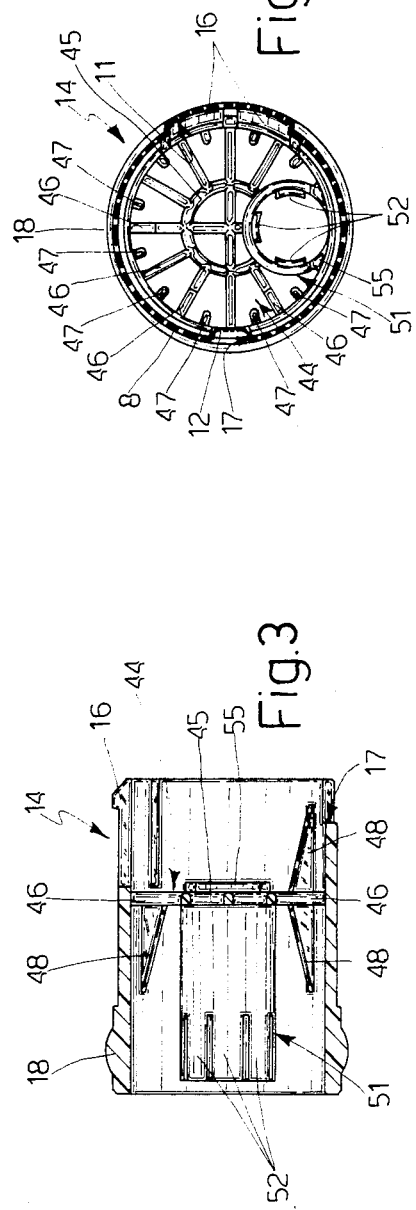

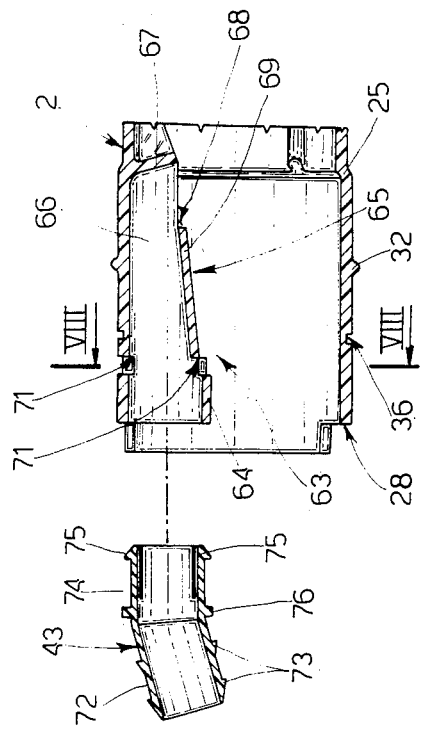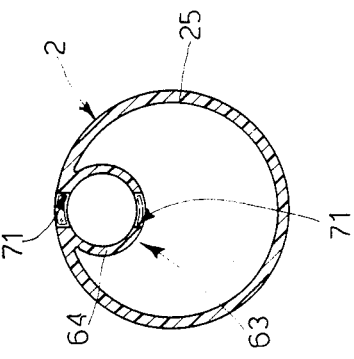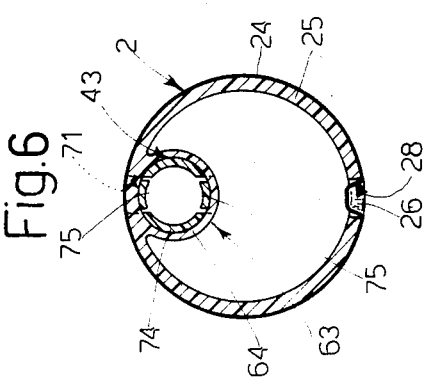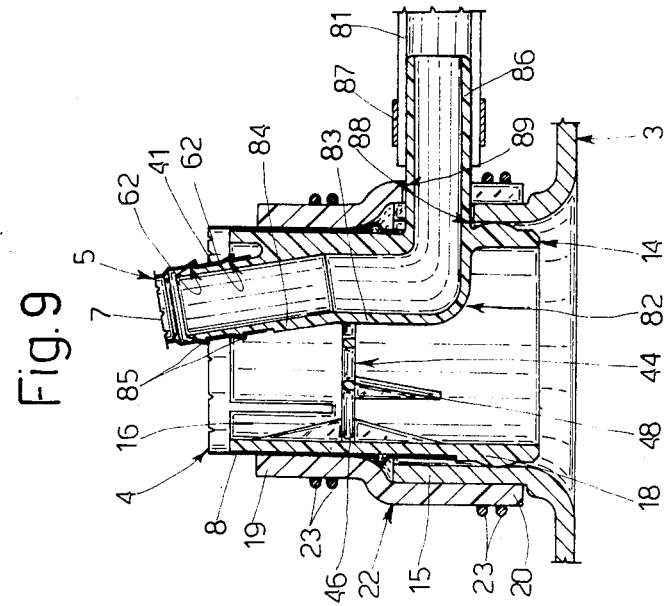

FUEL FILLER MEMBER FOR VEHICLES

The present invention relates to a fuel filler member for vehicles, for conveying fuel from a fuel filler inlet to the vehicle tank.

As is known, members of the above-indicated type currently installed in vehicles comprise a fuel filler pipe and a breather pipe which serves the function of conveying air present in the tank towards the fuel filler inlet.

SUMMARY OF THE INVENTION

The object of the present invention is that of providing a fuel filler member for motor vehicles, which will be of smaller size than that of members currently installed in vehicles.

Further objects and advantages will be apparent during the course of the following description.

According to the present invention there is provided a fuel filler member for vehicles, of the type comprising a first fuel filler pipe for putting a fuel filler inlet into communication with a fuel tank of the vehicle, wherein it includes a second, breather pipe installed within the interior of said first pipe, and able to convey air present in said tank towards said filler inlet.

BRIEF DESCRIPTION OF THE DRAWINGS

For a better understanding of the present invention a preferred embodiment is now described purely by way of non-limitative example, with reference to the attached drawings, in which:

FIG. 1 is a section through a fuel filler member formed according to the principles of the present invention;

FIG. 2 is a partial exploded view in section of a rear part of the member of FIG. 1;

FIG. 3 is a section taken on the line III—III of FIG. 2;

FIG. 4 is a front view of the part illustrated in FIG. 2;

FIG. 5 is a section of the part illustrated in FIG. 2 separated from its element;

FIG. 6 is a section taken on the line VI—VI of FIG. 1;

FIG. 7 is a partial exploded section view of a front part of the member of FIG. 1;

FIG. 8 is a section taken on the line VIII—VIII of FIG. 7; and

FIG. 9 is a section of a rear part of the member of FIG. 1 shaped differently from that illustrated in FIGS. 1 and 2.

DETAILED DESCRIPTION OF THE INVENTION

As illustrated in FIG. 1, a fuel filler member for conveying fuel from a fuel filler inlet 2 to a tank 3 of a vehicle is generally indicated with the reference numeral 1. The fuel filler inlet 2 and the tank 3 are illustrated only partially for simplicity. The member 1 comprises a fuel filler pipe 4 through which, in use, the fuel is conveyed from the fuel filler inlet 2 to the tank 3. The member 1 further includes a breather pipe 5 installed within the pipe 4 and through which, in use, air present in the tank 3 is conveyed towards the fuel filler inlet 2. The pipes 4 and 5 are made of plastics material and preferably nylon. The pipes 4 and 5 have a respective central main portion 6 and 7 of corrugated form, that is corrugated both on the inner surface and on the outer surface.

As illustrated in FIGS. 1 and 5, the pipe 4 has a first end portion 8 which is substantially smooth both internally and externally. Close to the junction between the central portion 6 and the interior of the portion 8 there are formed a cavity 11 and, diametrically opposite this latter, a projection 12. Close to its end the portion 8 has an undulation which defines an outer annular swelling 13. The cavity 11 and the projection 12 are defined by a respective projecting part of the portion 8 of the same thickness as this. The portion 8 is internally and coaxially engaged by a coupling sleeve part 14 which can be secured to a second sleeve 15 which extends from the tank 3 and which puts this latter into communication with the pipe 4.

The sleeve 14 is made of plastics material, and preferably of an acetal resin. At a first end the sleeve 14 has, parallel to its longitudinal axis, a pair of saw-shape teeth 16 and diametrically opposite these a U-shape notch 17. The teeth 16 and the notch 17 are formed in the edge of the sleeve 14, and in particular the teeth 16 are defined by three longitudinal slots. In use, the teeth 16 snap engage in the cavity 11 and the projection 12 engages the notch 17 (FIGS. 4 and 5). This coupling allows the pipe 4 to be orientated with respect to the sleeve 14. On the outer surface of the sleeve 14 close to its second end there is formed an annular swelling 18. In use, the sleeve 14 is force fitted into the sleeve 15 and the swelling 18, by coming into contact with the inner surface of the sleeve 15, forms the bond between this latter and the sleeve 14. The connections between the portions 8 of the pipe 4 and the sleeve 14 and between this latter and the sleeve 15 are made more secure by means of an annular element 22 which has a first portion 19 which houses the connection defined between the portion 8 and the sleeve 14 and a second portion 20, of greater diameter than that of the first 19, and which houses the connection defined between the sleeves 14 and 15. On both the portions 19 and 20 of the element 22 a respective pair of metal rings 23 act to press the element 22 towards the component elements of the connections described. The swelling 13 is located in correspondence with the junction between the two portions 19 and 20 of the element 22 and forms a shoulder against the portion 19 to obstruct disengagement of the sleeve 14 from the element 22.

As illustrated in FIGS. 1 and 6, the pipe 4 has a second end portion 24 the inner and outer surfaces of which are substantially smooth. The portion 24 is internally engaged by a tubular portion 25 of the fuel inlet 2. Within the portion 24, close to the junction with the central portion 6, there is formed a projection 26 formed in the same way as described for the projection 12 of the portion 8. Close to its free end the portion 24 has two undulations which define two outer annular swellings 27. The portion 25 of the fuel inlet 2 has at the edge of its free end a longitudinal U-shape slot 28 which, in use, is engaged by the projection 26, and on the outer surface has an annular swelling 32 engaging an annular cavity 33 formed within an annular element 34 able to join together the pipe 4 and the fuel inlet 2 and thereby render more secure the connection between the portions 24 and 25. In fact, the element 34 has another two annular cavities 35 engaged by the swellings 27. The elements 22 and 34 (FIG. 1) serve moreover to seal the respective connections against the outside. On the outer surface of the portion 25, between the swelling 32 and its free end, there is formed an annular seating 36 (FIG. 7) engaged by a sealing ring 37 (FIG. 1) able to cooperate with the inner surface of the portion 24. This element 34 can conveniently be formed by co-moulding.

With reference to FIG. 1, the pipe 5 is of decidedly smaller diameter than that of pipe 4, which houses it. The pipe 4 has two end portions 41 which are identical with one another and which are engaged in respective connections 42 and 43 supported respectively by the sleeve 14 and by the portion 25 of the fuel inlet 2. As is clearly visible in FIG. 1 the pipe 5 has a length less than that of the pipe 4 so that, even if the pipe 4 has, for example, a curve such as in FIG. 1, it is substantially rectilinear at least over a major part of its length, with the advantage deriving therefrom relating to the elimination of fuel flowing back within it as would be described better hereinbelow.

As illustrated in FIGS. from 1 to 4, within the sleeve 14 there is formed a grating 44 which serves the function of supporting the connection 42 and the function of preventing the passage of a possible duct towards the tank 3. This latter function prevents the theft of fuel, which can take place by introduction into the tank 3 of a duct by means of which the fuel is sucked out. The grating 44 has a central ring 45 radially from which extend, towards the inner surface of the sleeve 14, a plurality of small rods 46 one of which extends over the whole inner diameter of the sleeve 14 and a second, orthogonal to the first, extends from the sleeve 14 as far as the interior of the central ring 45 where it is connected to the outer surface of a small annular element 51 which extends, parallel to the axis of the sleeve 14, towards the tank 3. A small projection 47 (FIG. 4) extends from the inner surface of the sleeve 14 between each pair of rods 46. From both sides of the grating 44 extend a plurality of reinforcing ribs 48, between the rods 46 and the inner surface of the sleeve 14. The element 51 is centred with respect to the sleeve 14 and is formed, together with the grating 44, integrally with the sleeve 14. In particular, a portion of the sleeve 14 also forms part of the element 51 (FIGS. 2 and 4). At the free end of the end portion 41 there are formed a plurality of longitudinal teeth 52 similar to the teeth 16 but with their saw-tooth portion facing the interior of the element 51. The edge of the element 51 joined to the grating 44 is substantially co-planer with a major part of the inner face of the grating 44 and has on the remaining part a projection 55 which extends towards the pipe 5 and which is disposed in correspondence with the region of the junction between the sleeve 14 and the element 51.

The connection 42 is tubular and includes a first portion 56 on which the portion 41 of the pipe 5 engages and a second portion 57 which engages the element 51 and which extends as far as the interior of the tank 3. The portion 57 has on its outer surface, close to the connection with the portion 56, a projection 58 which abuts the edge of the element 51 co-planer with the grating 44. This coupling serves to orientate the connection 42 with respect to the element 51. On the outer surface of a central region of the portion 57 there is formed a groove 59 which extends along an arc of a circle and which is snap engaged by the teeth 52. The portions 56 and 57 have converging longitudinal axes in such a way that in use the portion 57 is coaxial with the element 51 and the axis of the portion 56 is convergent with the axis of the sleeve 14. The portion 56 has a first part connected to the portion 57 of the same inner and outer diameter as that of this latter, and a second part which extends the central portion 6 of the pipe 4 and which has an outer diameter less than that of the first part. This second part snap engages the portion 41 of the pipe 5 in that on the outer surface there are formed two annular projections 61 having a saw-tooth shape in cross-section, and which engage two annular cavities 62 defined by two undulations formed in the portion 41. The cavities 62 have the same shape as the projections 61 in cross-section.

As illustrated in FIGS. 1, 6, 7 and 8, within the portion 25 there is formed an annular element 63 similar to the element 51 in that it has a zone which also forms part of the portion 25. The element 63 has a first cylindrical part 64 which is situated close to the free end of the portion 25 and which forms the bond with the connection 43 and a second part 65 which extends towards the interior of the portion 25 and which is defined by a semi-cylindrical projection 26 of gradually decreasing width and by a flat wall 69 converging towards the region of the junction between the portion 25 and the element 63. The semi-cylindrical wall 66 is then closed at the top by a projection 67 extending from the inner surface of the portion 25, whilst the flat wall 69, being shorter than that of the semi-cylindrical wall 66, defines with the projection 67 an aperture 68. At the junction between the two parts of the element 63 there are formed, on this, in diametrically opposite positions, two slots 71 one of which is formed in the common region between the portion 25 and the element 63.

The connection 43 is tubular and has a first portion 72 which engages in the portion 41 of the pipe 5 and which is similar to the portion 56 of the connection 42, also having two annular projections 73 which, in section, have a saw-tooth shape, and a second portion 74 having two longitudinal teeth 75 also having a saw-tooth shape in section and which are able to engage the slots 71. Adjacent the junction between the portions 72 and 74 there is formed an outer annular projection 76 which, in use, abuts the edge at the free end of the element 63. As for the connection 42, the connection 43 also has its portions 72 and 74 with convergent longitudinal axes in such a way that, in use, the portion 74 is coaxial with the wall 66 of the element 63 in which it is engaged, and the axis of the portion 72 is convergent with the axis of the central portion 6 of the pipe 4 into which it extends.

In FIG. 9 there is illustrated a different embodiment of the connection between the pipes 4 and 5 and the tank 3. Whilst in FIG. 1 the pipe 5 communicates by means of the connector 42 directly with the interior part of the tank 3, in FIG. 9 the pipe 5 is made to communicate with an upper part of the tank 3 by means of a duct 81 extending therefrom. The parts of the connection relating to FIG. 9 similar to the parts of the connection illustrated in FIG. 1 are for simplicity indicated with the same reference numeral.

The substantial difference between the sleeve 14 illustrated in FIG. 1 and the sleeve 14 illustrated in FIG. 9 lies in the fact that within the interior of this latter there is defined a tubular connector 82 comprising a central portion 83 the axis of which is parallel to that of the sleeve 14 and having a region which also forms part of this latter. From the central portion 83 an end portion 84 extends obliquely towards the interior of the pipe 4, which end portion 84 engages in the portion 41 of the pipe 5 and for this has two annular projections 85 shaped, in section, as saw-teeth, which engage the cavity 62 of the portion 41. Orthogonally from the central portion 83 extends a second end portion which projects from the sleeve 14 and through the sleeve 15 and the portion 20 of the element 22, to engage within the interior of the duct 81 where it is retained by an outer band 87. In the sleeve 15 and in the element 22 there is formed a respective longitudinal slot 88 and 89 traversed by the portion 86. The grating 44, the connector 82 and the sleeve 14 are formed in one piece. The connection illustrated in FIG. 9 is thus differentiated from the connection illustrated in FIG. 1 only by the fact that in complex element 51-connector 42 is substituted by the connector 82. For the conformation of this latter the sleeve 15 and the element 22 have been slightly modified (slots 88 and 89) whilst all the other parts remain identical to those of the connection of FIG. 1.

From what has been described the numerous advantages consequent on the structure of the present invention will be apparent.

In particular, the principal advantage is that of having provided the member 1 which has installed within the interior of the fuel filler pipe 4 the breather pipe 5 for the air present in the tank 3. This reduces the overall bulk and eliminates the various bands or supporting brackets for the breather pipe, which currently in vehicles is external of the fuel filler pipe. Moreover the pipe 5, being shorter than the pipe 4, is disposed rectilinearly within this, at least for a major part. This gives functional advantages in that it has been noted during functional tests that the possibility of fuel flowing back through the member 1 is significantly reduced. This latter advantage is further due to the fact that the pipe 5 is corrugated for substantially the whole of its length. Finally, the advantages deriving from the formation of simple and rapid connections between the various component elements of the member 1 are to be noted, also considering the fact that these elements can be orientated with respect to one another to a precise position of the elements, and in particular of the connector 42 with respect to the tank 3 and the internal pipe 5 with respect to the fuel filler inlet 2.

Finally, it is clear that the member 1 described and illustrated here can be modified and varied without by this departing from the protective scope of the present invention.

I claim:

1. For use in conjunction with a vehicle including a fuel tank and a fuel filler inlet, a fuel filler member disposed between and connecting said inlet and said tank, said member comprising a first fuel filler pipe, and a second breather pipe located in said first pipe, said first and second pipes defining between them a passageway permitting fluid communication between said inlet and said tank; wherein said second pipe is dimensioned to convey air present in said tank towards said inlet, is in major part rectilinear, and is shorter than the longitudinal extent of said first pipe; and wherein said second pipe includes a second pipe central portion having a corrugated outer surface.

2. A member according to claim 1, wherein said second pipe central portion has a corrugated inner surface; and said first pipe includes a first pipe central portion having corrugated inner and outer surfaces.

3. A member according to claim 1, wherein said second pipe is made of plastic.

4. A member according to claim 3, wherein said second pipe is made of nylon.

5. A member according to claim 4, wherein said first pipe is made of plastic.

6. A member according to claim 5, wherein said first pipe is made of nylon.

7. For use in conjunction with a vehicle including a fuel tank and a fuel filler inlet, a fuel filler member disposed between and fluidly connecting said tank and said inlet, comprising a first fuel filler pipe placing said tank and said inlet in fluid communication, and a second breather pipe disposed in said first pipe and dimensioned to convey air present in said tank towards said inlet, wherein said first pipe has a first end portion engaged internally by an annular portion of said fuel filler inlet and a second end portion internally engaged by a first sleeve in communication with said tank by means of a second sleeve extending from said tank and internally engaged by said first sleeve; between said annular portion of said fuel filler inlet and said first end portion of said first pipe and between said first sleeve and said second end portion of said first pipe there being provided respective first and second fixing and orientation means.

8. A member according to claim 7, wherein said first means comprise:
   a first projection formed on the interior of said first end portion of said first pipe and engageable with a first notch formed on an end of said annular portion of said fuel filler inlet;
   at least one first annular swelling formed on the outer surface of said annular portion of said fuel filler inlet and engageable in a first annular cavity formed on the inner surface of a first annular element; and
   at least one first undulation formed on the outer surface of said first end portion of said first pipe and engageable with an annular cavity formed on the inner surface of said first element.

9. A member according to claim 7, wherein said second means comprise:
   a second projection formed within said second end portion of said first pipe and engageable in a second notch formed on an end of said first sleeve;
   a third cavity formed within said second end portion of said first pipe and snap engageable by at least one first tooth of saw-tooth shape extending from the end of said first sleeve;
   a second annular element a first portion of which is internally engaged by a part of said second end portion of said first pipe in turn internally engaged by a part of said first sleeve; and
   a second undulation formed on the outer surface of said second end portion of said first pipe and able to constitute a shoulder for said first portion of said second annular element.

10. A member according to claim 9, wherein said second annular element includes a second portion internally engaged by said second sleeve which in turn is internally engaged by a part of said first sleeve.

11. A member according to claim 7, wherein said second pipe includes a first end portion engaged internally by a first tubular connector, and a second end portion engaged internally by a second tubular connector; there being provided respective third and fourth fixing and orientation means between said first connector and said annular portion of said fuel filler inlet, and between said second connector and said first sleeve.

12. A member according to claim 11, wherein said third means include at least one second tooth extending from an end of said first connector and engageable with a slot formed on a third annular element rigidly connected to and within said annular portion of said fuel filler inlet; said first connector including a first inner portion coaxial with said third element, the axis of which is parallel to that of said fuel filler inlet and a second portion within said first end portion of said second pipe and extending obliquely with respect to said first portion toward the interior of said first pipe.

13. A member according to claim 11, wherein said fourth means include at least a third tooth extending from an edge of a fourth annular element and engageable with a fourth cavity formed on the outer surface of said second connector; this latter having a first inner portion coaxial with said fourth element the axis of which is parallel to that of said first sleeve, and a second portion within said second end portion of said second pipe and extending obliquely with respect to said first inner portion towards the interior of said first pipe, and said first inner portion of said second connector extending into said tank.

14. A member according to claim 11, wherein said second collector has a central portion rigidly connected to and parallel with said first sleeve, a first end portion extending obliquely with respect to said central portion towards the interior of said first pipe where it engages said second end portion of said second end portion of said second pipe, and a second end portion which extends orthogonally with respect to said central portion to the exterior of said first sleeve which is connected to a duct extending from said tank.

15. A member according to claim 7, wherein said first sleeve is made of an acetal resin.

16. A member according to claim 7, wherein within said first sleeve there is formed a grating traversed by said second connector or and adapted to prevent the passage of other ducts or pipes.

* * * * *